US012056238B2

(12) United States Patent
Ševčenko et al.

(10) Patent No.: US 12,056,238 B2
(45) Date of Patent: *Aug. 6, 2024

(54) SYSTEM AND METHOD FOR ANTIMALWARE APPLICATION ADVERSARIAL MACHINE LEARNING

(71) Applicant: UAB 360 IT, Vilnius (LT)

(72) Inventors: Aleksandr Ševčenko, Vilnius (LT); Mantas Briliauskas, Vilnius (LT)

(73) Assignee: UAB 360 IT, Vilnius (LT)

( * ) Notice: Subject to any disclaimer, the term of this patent is extended or adjusted under 35 U.S.C. 154(b) by 0 days.

This patent is subject to a terminal disclaimer.

(21) Appl. No.: 17/725,718

(22) Filed: Apr. 21, 2022

(65) Prior Publication Data

US 2023/0342463 A1    Oct. 26, 2023

(51) Int. Cl.
*H04L 29/06* (2006.01)
*G06F 21/56* (2013.01)

(52) U.S. Cl.
CPC ...... *G06F 21/565* (2013.01); *G06F 2221/033* (2013.01)

(58) Field of Classification Search
CPC .. H04L 9/3218; H04L 9/3247; H04L 2209/46
See application file for complete search history.

(56) References Cited

U.S. PATENT DOCUMENTS

| | | | |
|---|---|---|---|
| 2019/0215329 A1* | 7/2019 | Levy | G06N 20/00 |
| 2022/0059107 A1* | 2/2022 | Mustafa | G06N 3/088 |
| 2022/0366040 A1* | 11/2022 | Marbouti | G06N 3/09 |
| 2023/0049479 A1 | 2/2023 | Mozo Velasco et al. | |
| 2023/0134508 A1* | 5/2023 | Ko | G06V 10/82 382/141 |

OTHER PUBLICATIONS

Office Action issued for U.S. Appl. No. 17/725,796, dated Jun. 8, 2023.
Office Action issued for U.S. Appl. No. 17/725,802, dated Jun. 23, 2023.
Federal Trade Commission, Consumer Advice, How to Recognize, Remove, and Avoid Malware, May 2021, FTC, 1 bages 1-4 (Year: 2021).

* cited by examiner

*Primary Examiner* — Evans Desrosiers
(74) *Attorney, Agent, or Firm* — Meunier Carlin & Curfman LLC

(57) ABSTRACT

An exemplary system and method are disclosed for detecting malware via an antimalware application employing adversarial machine learning such as generative adversarial machine learning and the training and/or configuring of such systems. The exemplary system and method are configured with two or more generative adversarial networks (GANs), including (i) a first generative adversarial network (GAN) that can be configured using a library of malware code or non-malware code and (ii) a second generative adversarial network (GAN) that operates in conjunction with the first generative adversarial network (GAN) in which the second generative adversarial network is configured using a library of non-malware code.

11 Claims, 9 Drawing Sheets

SYSTEM AND METHOD FOR ANTIMALWARE APPLICATION ADVERSARIAL MACHINE LEARNING

BACKGROUND

Malware generally includes a type of malicious software that intentionally harms a computer or network environment where it is located. Malware can be hidden in virtually any type of file, making detecting and eliminating malware difficult. Antimalware software (also referred to and interchangeably used herein as "anti-malware" software) is used to detect and eliminate malware, ideally before it is opened or executed by a user of a computing device. Malware can also include non-malicious that cause an unwanted operation or effect on the computer or network environment.

One such method is through the use of machine learning and deep learning models. These models take as input features that are extracted from a file, or the files themselves, before it is executed and predict whether or not a file is a malware. If a file is predicted to be malware, a user or administrator can be alerted before they run the file. Antimalware (AM) applications can be trained for better detection of malware. In some cases, AM applications are being trained using malicious applications from extensive libraries of malware examples.

There is a benefit to improving the detection of malware.

SUMMARY

An exemplary system and method are disclosed for detecting malware via an antimalware application employing a deep learning system that is trained using, in substantial parts, synthesized data generated from an adversarial machine learning such as generative adversarial network (GAN). The adversarial machine learning itself is trained using software or snippet thereof with non-malware code that are abundantly available to establish a baseline to which abnormalities such as malware code can be detected.

The adversarial machine learning of the exemplary system and method can be subsequently used to create synthesized code similar in data structure and pattern to malware code, as well as non-malware code, for a repository of such models that can then be used to train the deep learning system of the antimalware application. Deep learning systems can be exceptionally powerful tools in classifying software or snippet as having the presence of malware code. To operate well though, a deep learning system requires extensive libraries of training data to train its neural network model, e.g., with sufficient generalization and avoid overfitting. Generative adversarial networks can provide a new type of training architecture for the training-data generation to generate such training data to facilitate the training of the deep learning system for the antimalware application. The generative adversarial network may itself employ a deep learning system—this is separate from the aforementioned deep learning system of the antimalware application.

In some embodiments, the exemplary GAN system and method are configured to include two or more generative adversarial networks (GANs), including a first generative adversarial network (GAN) that can be configured, as described above, using a large library of non-malware code to provide a baseline to which abnormalities such as malware code can be detected. In such embodiments, the exemplary system and method further include a second generative adversarial network (GAN) that operates in conjunction with the first generative adversarial network (GAN) in which the second generative adversarial network is configured using a small library of malware code to establish a correlation of the data structure and pattern to the malware code. In being able to train using non-malware code in combination with malware code, the exemplary GAN system and method in itself employing a deep learning model can sufficiently learn correlations to what constitutes non-malware code to which anomalies such as malware can be detected and to which training or configuration of the second generative adversarial network can be enhanced by the first generative adversarial network.

The implementation of a second generative adversarial network and, in some embodiments, third or fourth generative adversarial networks, etc., as described herein, improves upon this training architecture paradigm to facilitate the training of multiple distinct neural networks associated with each respective generative adversarial network to provide training data for the training of a neural network that is even better suited for malware detection in having each of the multiple generative adversarial networks operate on a unique set of training data to allow the multiple generative adversarial networks, collectively, to train on heterogeneous data comprising malware and non-malware code. Indeed, the multiple generative adversarial networks of the training-data generation can itself be trained without an extensive malware application library to generate such malware application library to then train a deep learning system for the antimalware application. The two or more generative adversarial networks can operate individually as separate systems or models or interdependently in combination with one another.

In some embodiments, the aforementioned deep learning system of the generative adversarial networks may be employed as the deep learning system of the antimalware application.

As used herein, the term "antimalware application" refers to a client application that can be executed on a machine to classify and/or detect the presence of malware code in a computer-executable file or parse-able computer instructions of a computer-executable script. The file may be a computer-executable file (e.g., a binary file), an encoded/compressed file of the same or a set of files. The file may be embedded or attached in an electronic communication (e.g., email). The computer-executable script may be descriptive mark-up language (non-binary file) for a document or website component to be parsed or executed by a web browser. The computer-executable script may be cascading style sheet (CSS) files that are called upon or operate with the script. The files may execute on a personal computing device such as laptops or tablets, a computer server, a mobile device such as a smartphone, network equipment such as a router or switch, a network-connected machine-to-machine (M2M), or an Internet-of-Thing (IoT) device such as a home-networked-camera, appliance, home controller, as well as industrial or manufacturing-network equipment.

As used herein, the term "malware code" refers to a virus code, a spyware code, a trojan code, a snooping code, and bloatware that can disrupt or compromise the operation, privacy, and/or security of a computer, server, client, or computer network. Virus code generally includes instructions for a computer virus, which is a type of computer program that, when executed, replicates itself by modifying other computer programs and inserting its own code. Spyware generally includes instructions for a software with malicious behavior that aims to gather information about a person or organization and send it to another entity that harms the user by endangering the device's security or by violating the person's privacy. Trojan code generally includes instructions for a malware that misleads the user or computer system or networks of its true intent. Unlike computer viruses, worms, and rogue security software, trojan code do not typically inject themselves into other files or otherwise propagate themselves. Spyware code generally includes instructions that try to keep itself hidden while it secretly records information and tracks internet-usage activities on a computer, mobile device, or computing network equipment. Snooping code, as used herein, refers to spyware code that tries to keep itself hidden while it secretly records information and track internet-usage activities and intercepts communication associated with another computer. Bloatware code generally includes instructions for unwanted and potentially harmful software, akin to junk mail, loaded on a computing device employing sales and marketing techniques that can affect a user's experience and device performance.

In some embodiments, the exemplary GAN system and method is configured with a combination of virus code, a spyware code, a trojan code, a snooping code, and bloatware. In other embodiments, the exemplary GAN system and method is configured with only one of a virus code, a spyware code, a trojan code, a snooping code, and bloatware to learn the pattern and/or data structure of that class of malware to generate synthesized malware code, as well as non-malware code for that class of malware.

The term "software" refers to a collection of computer instructions that control the operation of a computer, networked device, or computing hardware. As the lowest programming level, the software includes computer instructions for control of computer-associated hardware such as the central processing units (CPUs), graphical processing unit, memory controllers, and peripheral devices. Software also includes computer instructions for an operating system that manages the computer's hardware resources, software resources, and provides common services for computer programs. Software also includes computer programs for a given application.

In an aspect, a method is disclosed to generate training data set for training an antimalware machine-learning model, the method comprising generating, by one or more processors, a first generative adversarial network (GAN) using a first library of malware training sets comprising a plurality of malware code; generating, by the one or more processors, a second generative adversarial network (GAN) using a second library of non-malware training sets comprising a plurality of instruction code; generating, by the one or more processors, via the first generative adversarial network, a first set of synthetic malware code; generating, by the one or more processors, via the second generative adversarial network, a second set of synthetic non-malware code; and generating, by the one or more processors, the antimalware machine-learning model using, at least, the first set of synthetic malware code and the second set of synthetic non-malware code, wherein the antimalware machine-learning model is employed in an antimalware application.

In some embodiments, the first generative adversarial network comprises a first deep neural network configured as a generator and a second deep neural network configured as a discriminator, and wherein the second generative adversarial network comprises a third deep neural network configured as a generator and a fourth deep neural network configured as a discriminator, wherein the first deep neural network and the third deep neural network comprise different weight values among the different layers.

In some embodiments, the first generative adversarial network comprises a first set of loss functions that are employed in the first discriminator and the first generator, wherein the second generative adversarial network comprises a second set of loss functions that are employed in the second discriminator and the second generator, and wherein the first set of loss functions is different from the second set of loss functions.

In some embodiments, the first set of loss functions and the second set of loss functions have the same equation topology or type.

In some embodiments, the first set of loss functions or the second set of loss functions comprises at least one of a minimax loss function, a modified minimax loss function, a Wasserstein loss function, and a combination thereof.

In some embodiments, the malware code comprises a virus code, a spyware code, a trojan code, or a snooping code.

In some embodiments, the first library of malware training sets comprising the plurality of malware code comprises a plurality of binary files, each comprising a malware code portion.

In some embodiments, the plurality of binary files are parsed to provide a binary segment comprising the malware code portion, and wherein each of the plurality of parsed binary files has the same binary length as inputs to the first generative adversarial network.

In some embodiments, each of the plurality of instruction codes of the non-malware training set has the same binary lengths when provided as inputs to the second generative adversarial network.

In another aspect, a system is disclosed comprising one or more computing systems having one or more processors and memory having instructions stored thereon, wherein execution of the instructions by the one or more processors causes the one or more processors to execute: a first generative adversarial network, wherein the first generative adversarial network is configured using a first library of malware training sets comprising a plurality of malware code, wherein the first generative adversarial network is configured to generate a first set of synthetic malware code; a second generative adversarial network, wherein the second generative adversarial network using a second library of non-malware training sets comprising a plurality of instruction code, wherein the second generative adversarial network is configured to generate a second set of synthetic non-malware code; and an antimalware machine-learning model configured to operate in an antimalware application, wherein the antimalware machine-learning model is configured using, at least, the first set of synthetic malware code and the second set of synthetic non-malware code.

In some embodiments, the first generative adversarial network comprises a first deep neural network configured as a generator and a second deep neural network configured as a discriminator, and wherein the second generative adversarial network comprises a third deep neural network configured as a generator and a fourth deep neural network configured as a discriminator, wherein the first deep neural network and the third deep neural network comprise different weight values among the different layers.

In some embodiments, the first generative adversarial network comprises a first set of loss functions that are employed in the first discriminator and the first generator, wherein the second generative adversarial network comprises a second set of loss functions that are employed in the second discriminator and the second generator, and wherein the first set of loss functions is different from the second set of loss functions.

In some embodiments, the first set of loss functions and the second set of loss functions have the same equation topology or type.

In some embodiments, the first set of loss functions or the second set of loss functions comprises at least one of a minimax loss function, a modified minimax loss function, or a Wasserstein loss function.

In another aspect, a non-transitory computer-readable medium is disclosed comprising instruction code for an antimalware machine-learning model for use in an antimalware application, wherein the antimalware machine-learning model is configured using, at least, a first set of synthetic malware code and a second set of synthetic non-malware code, wherein the antimalware machine-learning model is employed in an antimalware, and wherein the first set of synthetic malware code is generated using a first generative adversarial network, and wherein the second set of synthetic malware code is generated using a second generative adversarial network.

In some embodiments, the first generative adversarial network comprises a first deep neural network configured as a generator and a second deep neural network configured as a discriminator, and wherein the second generative adversarial network comprises a third deep neural network configured as a generator and a fourth deep neural network configured as a discriminator, wherein the first deep neural network and the third deep neural network comprise different weight values among the different layers.

In some embodiments, the first generative adversarial network comprises a first set of loss functions that are employed in the first discriminator and the first generator, wherein the second generative adversarial network comprises a second set of loss functions that are employed in the second discriminator and the second generator, and wherein the first set of loss functions is different from the second set of loss functions.

In some embodiments, the first set of loss functions is different from the second set of loss functions.

In some embodiments, the first set of loss functions and the second set of loss functions have the same equation topology or type.

In some embodiments, the first set of loss functions or the second set of loss functions comprises at least one of a minimax loss function, a modified minimax loss function, a Wasserstein loss function, and a combination thereof.

In another aspect, a method is disclosed to generate training data set for training an antimalware machine-learning model, the method comprising: generating, by one or more processors, a generative adversarial network (GAN) using (i) a first library of malware training sets comprising a plurality of malware code comprising a type of least one of virus code, a spyware code, a trojan code, or a snooping code and (ii) a second library of non-malware training sets comprising a plurality of instruction code lacking the malware code, wherein the generative adversarial network comprises a first deep neural network configured as a first generator, a second deep neural network configured as a second generator, and a third deep neural network configured as a discriminator, wherein the first, second, and third deep neural network each comprises different weight values among its respective different layers; generating, by the one or more processors, via the generative adversarial network, a set of synthetic malware code; and generating, by the one or more processors, the antimalware machine-learning model using, at least, the set of synthetic malware code, wherein the antimalware machine-learning model is employed in an antimalware application.

In some embodiments, the third deep neural network is configured to sample between a first output of the first deep neural network, a second output of the second deep neural network, the first library of malware training sets, and the second library of non-malware training sets.

In some embodiments, the generative adversarial network comprises a first set of loss functions that are employed to adjust (i) a first set of nodes of the third deep neural network of the discriminator and (ii) the first deep neural network of the first generator.

In some embodiments, the first set of loss functions comprises at least one of a minimax loss function, a modified minimax loss function, or a Wasserstein loss function.

In some embodiments, the generative adversarial network further comprises a second set of loss functions that are employed to adjust (i) a second set of nodes of the third deep neural network of the discriminator and (ii) the second deep neural network of the second generator, wherein the first set of nodes and the second set of nodes do not share a common node.

In some embodiments, the generative adversarial network further comprises a second set of loss functions that are employed to adjust (i) one or more nodes of at least a portion of the first set of nodes of the third deep neural network of the discriminator and (ii) the second deep neural network of the second generator.

In some embodiments, the antimalware machine-learning model is further configured using a set of synthetic non-malware code.

In some embodiments, the antimalware machine-learning model is further configured using a set of sampled non-malware code.

In some embodiments, the antimalware machine-learning model is further configured using a set of sampled malware code.

In another aspect, a non-transitory computer-readable medium is disclosed comprising instruction code for an antimalware machine-learning model for use in an antimalware application, wherein the antimalware machine-learning model is configured using, at least, a first set of synthetic malware code and a second set of synthetic non-malware code, wherein the antimalware machine-learning model is employed in an antimalware, and wherein the first set of synthetic malware code is generated using a generative adversarial network, wherein the generative adversarial network comprises a first deep neural network configured as a first generator, a second deep neural network configured as a second generator, and a third deep neural network configured as a discriminator, wherein the first, second, and third deep neural network each comprises different weight values among its respective different layers.

In some embodiments, the third deep neural network is configured to sample between a first output of the first deep neural network, a second output of the second deep neural network, the first library of malware training sets, and the second library of non-malware training sets.

In some embodiments, the generative adversarial network comprises a first set of loss functions that are employed to adjust (i) a first set of nodes of the third deep neural network of the discriminator and (ii) the first deep neural network of the first generator.

In some embodiments, the first set of loss functions comprises at least one of a minimax loss function, a modified minimax loss function, or a Wasserstein loss function.

In some embodiments, the generative adversarial network further comprises a second set of loss functions that are employed to adjust (i) a second set of nodes of the third deep neural network of the discriminator and (ii) the second deep neural network of the second generator, wherein the first set of nodes and the second set of nodes do not share a common node.

In some embodiments, the generative adversarial network further comprises a second set of loss functions that are employed to adjust (i) one or more nodes of at least a portion of the first set of nodes of the third deep neural network of the discriminator and (ii) the second deep neural network of the second generator.

In some embodiments, the antimalware machine-learning model is further configured using a set of synthetic non-malware code.

In some embodiments, the antimalware machine-learning model is further configured using a set of sampled non-malware code and sampled malware code.

In another aspect, a system is disclosed comprising: one or more computing systems having one or more processors and memory having instructions stored thereon, wherein execution of the instructions by the one or more processors causes the one or more processors to execute: generate a generative adversarial network (GAN) using (i) a first library of malware training sets comprising a plurality of malware code comprising a type of least one of virus code, a spyware code, a trojan code, or a snooping code and (ii) a second library of non-malware training sets comprising a plurality of instruction code lacking the malware code, wherein the generative adversarial network comprises a first deep neural network configured as a first generator, a second deep neural network configured as a second generator, and a third deep neural network configured as a discriminator, wherein the first, second, and third deep neural network each comprises different weight values among its respective different layers; generate, via the generative adversarial network, a set of synthetic malware code; and generate the antimalware machine-learning model using, at least, the set of synthetic malware code, wherein the antimalware machine-learning model is employed in an antimalware application.

In some embodiments, the third deep neural network is configured to sample between a first output of the first deep neural network, a second output of the second deep neural network, the first library of malware training sets, and the second library of non-malware training sets.

In some embodiments, the generative adversarial network comprises a first set of loss functions that are employed to adjust (i) a first set of nodes of the third deep neural network of the discriminator and (ii) the first deep neural network of the first generator, wherein the first set of loss functions comprises at least one of a minimax loss function, a modified minimax loss function, or a Wasserstein loss function, and wherein the generative adversarial network further comprises a second set of loss functions that are employed to adjust (i) a second set of nodes of the third deep neural network of the discriminator and (ii) the second deep neural network of the second generator, wherein the first set of nodes and the second set of nodes do not share a common node.

In another aspect, a method is disclosed to generate training data set for training an antimalware machine-learning model, the method comprising: generating, by one or more processors, a generative adversarial network (GAN) using (i) a first library of malware training sets comprising a plurality of malware code of a type of least one of virus code, a spyware code, a trojan code, or a snooping code and (ii) a second library of non-malware training sets comprising a plurality of instruction code lacking the malware code, wherein the generative adversarial network includes (i) a first discriminator to configure a first generator that generates malware code, (ii) a second discriminator to configure a second generator that generates non-malware code, and (iii) a third discriminator to configure the first and second generator, wherein the third discriminator shares the loss function components as the first discriminator and second discriminator; generating, by the one or more processors, via the generative adversarial network, a set of synthetic malware code; and generating, by the one or more processors, the antimalware machine-learning model using, at least, the set of synthetic malware code, wherein the antimalware machine-learning model is employed in an antimalware application.

In some embodiments, the generative adversarial network comprises a first deep neural network configured as a first generator, a second deep neural network configured as a second generator, a third deep neural network configured as a first discriminator, a fourth deep neural network configured as a fourth discriminator, and a fifth deep neural network configured as a fifth discriminator, wherein the first, second, third, fourth, and fifth deep neural network each comprises different weight values among its respective different layers.

In some embodiments, the generative adversarial network includes a first loss function to adjust (i) a first set of nodes of the third deep neural network of the first discriminator, (ii) the first deep neural network of the first generator, and (iii) the fifth deep neural network of the third discriminator.

In some embodiments, the generative adversarial network includes a second loss function to adjust (i) a second set of nodes of the fourth deep neural network of the second discriminator, (ii) the second deep neural network of the second generator, and (iii) the fifth deep neural network of the third discriminator.

In some embodiments, the third discriminator is configured to provide feedback to the first and/or second generative adversarial network to distinguish between the non-malicious training data and the malicious training data.

In some embodiments, the first loss function comprises at least one of a minimax loss function, a modified minimax loss function, or a Wasserstein loss function, wherein the second loss function comprises at least one of a minimax loss function, a modified minimax loss function, or a Wasserstein loss function, and wherein the first loss function and the second loss function are the same type.

In some embodiments, the first loss function comprises at least one of a minimax loss function, a modified minimax loss function, or a Wasserstein loss function, wherein the second loss function comprises at least one of a minimax loss function, a modified minimax loss function, or a Wasserstein loss function, and wherein the first loss function and the second loss function are different types.

In some embodiments, the antimalware machine-learning model is further configured using, at least, the set of synthetic non-malware code.

In another aspect, a non-transitory computer-readable medium is disclosed comprising instruction code for an antimalware machine-learning model for use in an antimalware application, wherein the antimalware machine-learning model is configured using, at least, a first set of synthetic malware code and a second set of synthetic non-malware code, wherein the antimalware machine-learning model is employed in an antimalware, and wherein the first set of synthetic malware code is generated using a generative adversarial network, wherein the generative adversarial network includes (i) a first discriminator to configure a first generator that generates malware code, (ii) a second discriminator to configure a second generator that generates non-malware code, and (iii) a third discriminator to configure the first and second generator, wherein the third discriminator shares the loss function components as the first discriminator and second discriminator.

In some embodiments, the generative adversarial network comprises a first deep neural network configured as a first generator, a second deep neural network configured as a second generator, a third deep neural network configured as a first discriminator, a fourth deep neural network configured as a fourth discriminator, and a fifth deep neural network configured as a fifth discriminator, wherein the first, second, third, fourth, and fifth deep neural network each comprises different weight values among its respective different layers.

In some embodiments, the generative adversarial network includes a first loss function to adjust (i) a first set of nodes of the third deep neural network of the first discriminator, (ii) the first deep neural network of the first generator, and (iii) the fifth deep neural network of the third discriminator.

In some embodiments, the generative adversarial network includes a second loss function to adjust (i) a second set of nodes of the fourth deep neural network of the second discriminator, (ii) the second deep neural network of the second generator, and (iii) the fifth deep neural network of the third discriminator.

In some embodiments, the third discriminator is configured to provide feedback to the first and/or second generative adversarial network to distinguish between the non-malicious training data and the malicious training data.

In some embodiments, the first loss function comprises at least one of a minimax loss function, a modified minimax loss function, or a Wasserstein loss function, wherein the second loss function comprises at least one of a minimax loss function, a modified minimax loss function, or a Wasserstein loss function, and wherein the first loss function and the second loss function are the same type.

In some embodiments, the first loss function comprises at least one of a minimax loss function, a modified minimax loss function, or a Wasserstein loss function, wherein the second loss function comprises at least one of a minimax loss function, a modified minimax loss function, or a Wasserstein loss function, and wherein the first loss function and the second loss function are different types.

In another aspect, a system is disclosed comprising one or more computing systems having one or more processors and memory having instructions stored thereon, wherein execution of the instructions by the one or more processors causes the one or more processors to: generate a generative adversarial network (GAN) using (i) a first library of malware training sets comprising a plurality of malware code of a type of least one of virus code, a spyware code, a trojan code, or a snooping code and (ii) a second library of non-malware training sets comprising a plurality of instruction code lacking the malware code, wherein the generative adversarial network includes (i) a first discriminator to configure a first generator that generates malware code, (ii) a second discriminator to configure a second generator that generates non-malware code, and (iii) a third discriminator to configure the first and second generator, wherein the third discriminator shares the loss function components as the first discriminator and second discriminator; generate, via the generative adversarial network, a set of synthetic malware code; and generate the antimalware machine-learning model using, at least, the set of synthetic malware code, wherein the antimalware machine-learning model is employed in an antimalware application.

In some embodiments, the generative adversarial network comprises a first deep neural network configured as a first generator, a second deep neural network configured as a second generator, a third deep neural network configured as a first discriminator, a fourth deep neural network configured as a fourth discriminator, and a fifth deep neural network configured as a fifth discriminator, wherein the first, second, third, fourth, and fifth deep neural network each comprises different weight values among its respective different layers.

In some embodiments, the generative adversarial network includes a first loss function to adjust (i) a first set of nodes of the third deep neural network of the first discriminator, (ii) the first deep neural network of the first generator, and (iii) the fifth deep neural network of the third discriminator.

In some embodiments, the generative adversarial network includes a second loss function to adjust (i) a second set of nodes of the fourth deep neural network of the second discriminator, (ii) the second deep neural network of the second generator, and (iii) the fifth deep neural network of the third discriminator.

In some embodiments, the third discriminator is configured to provide feedback to the first and/or second generative adversarial network to distinguish between the non-malicious training data and the malicious training data.

In some embodiments, the first loss function comprises at least one of a minimax loss function, a modified minimax loss function, or a Wasserstein loss function, wherein the second loss function comprises at least one of a minimax loss function, a modified minimax loss function, or a Wasserstein loss function, and wherein the first loss function and the second loss function are the same type.

In some embodiments, the first loss function comprises at least one of a minimax loss function, a modified minimax loss function, or a Wasserstein loss function, wherein the second loss function comprises at least one of a minimax loss function, a modified minimax loss function, or a Wasserstein loss function, and wherein the first loss function and the second loss function are different types.

Additional advantages of the invention will be set forth in part in the description which follows, and in part will be obvious from the description or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments and, together with the description, serve to explain the principles of the methods and systems.

DETAILED SPECIFICATION

An exemplary system and method are disclosed for detecting malware via an antimalware application employing adversarial machine learning such as generative adversarial machine learning and the training and/or configuring of such systems. The exemplary system and method are configured with two or more generative adversarial networks (GANs), including (i) a first generative adversarial network (GAN) that can be configured using a library of malware code or non-malware code and (ii) a second generative adversarial network (GAN) that operates in conjunction with the first generative adversarial network (GAN) in which the second generative adversarial network is configured using a library of non-malware code.

Example System #1

Figure 1A:
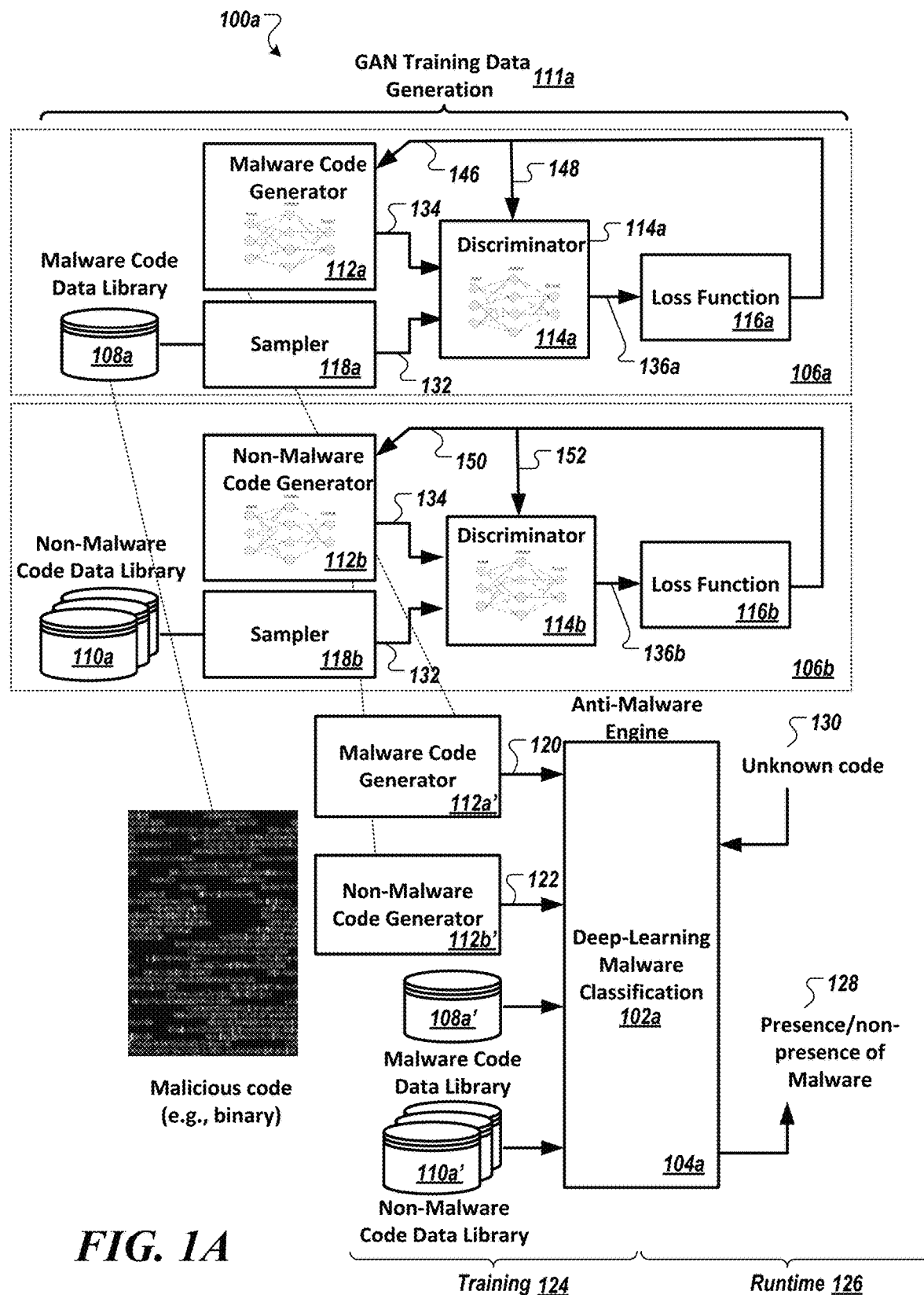
FIGS. 1A, 1B, and 1C each shows an example antimalware application system comprising an antimalware deep learning application executing in an anti-malware engine that is configured directly or indirectly from data generated by an adversarial machine learning model in accordance with an illustrative embodiment.

FIG. 1A shows an example antimalware application system 100 (shown as 100a) comprising antimalware application 102 (shown as "Deep Learning Malware Classification" 102a) executing in an anti-malware engine 104 (shown as 104a) that is configured directly or indirectly from data generated by an adversarial machine learning model 106 (shown as 106a, 106b) in accordance with an illustrative embodiment.

In the example shown in FIG. 1A, the adversarial machine learning model(s) 106 includes (i) a first adversarial machine learning model 106a that is trained using one or more libraries of malware code 108 (shown as "Malware Code Data Library" 108a) and (ii) a second adversarial machine learning model 106b that is trained using one or more libraries of non-malware code 110 (shown as "Non-Malware Code Data Library" 110a). The adversarial machine learning model(s) 106 are used as part of a data generation system 111 (shown as "GAN Training Data Generation" system 111a). The malware and non-malware code (108, 110) may be binary files or snippets/portions of binary files. Non-binary instruction libraries may be converted to binary files as a part of a data preparation or normalization process.

Each of the first and second adversarial machine learning models 106a, 106b includes a code generator module 112 (shown as "Malware Code Generator" module 112a, and "Non-Malware Code Generator" module 112b, respectively), a discriminator module 114 (shown as 114a, 114b), a loss function 116 (shown as 116a, 116b), and a sampler module 118 (shown as 118a, 118b).

The code generator module 112 (e.g., 112a or 112b) may employ a deep learning system, such as a neural network, that is configured to generate synthetic training data for training the antimalware application 102a. The sampler module 118 (e.g., 118a or 118b) is configured, in an embodiment, to randomly sample data from a data library (e.g., 108a or 110a) and provide the sampled data as input 132 to the discriminator 114 (e.g., 114a, 114b). The discriminator 114 (e.g., 114a or 114b) is configured to sample as its input from the generator 112 (e.g., 112a or 112b) (input 134) or the sampler 118 (e.g., 118a or 118b) (input 132) and to classify the input (132, 134) as being a real or a fake input. Based on the classification, the discriminator (e.g., 114a or 114b) provides an output 136 (shown as 136, 136b, respectively) to the loss function (e.g., 116a, 116b). Each discriminator (e.g., 114a, 114b) may implement its own neural network (e.g., 114a, 114b), LTMS network, or other machine learning/AI networks.

Loss function example #1. Wasserstein Loss function employs a separate loss function for the generator 112 (e.g., 112a, 112b, 112c, 112d) and the discriminator 114 (e.g., 114a, 114b, 114c) (also referred to as a "critic" in certain implementations). The critic loss function has the form per Equation 1:

$$D(x)-D(G(z))$$ (Eq. 1)

The critic loss is employed to adjust the weights or configurations of the discriminator/critic to maximize its function. The generator loss function is employed to adjust the weight or configurations of the generator 112 and has the form: $D(G(z))$. In these functions, $D(x)$ is the critic's output for a real instance. $G(z)$ is the generator's output when given noise z. $D(G(z))$ is the critic's output for a fake instance. The output of critic D can be between "1" and "0," though it does not have to be.

In some embodiments, two or more adversarial machine learning models may be trained based on different types of malware code, e.g., trojan, bloatware, spyware.

Loss function example #2. Minimax Loss function is employed by the generator (e.g., 112), which tries to minimize the loss function, and by the discriminator (e.g., 114), which tries to maximize the loss equation, defined as Equation 2.

$$\text{Loss Function}=E_x[\log(D(x))]+E_z[\log(1-D(G(z)))]$$ (Eq. 2)

In Equation 2, $D(x)$ is the discriminator's estimate of the probability that real data instance x is real. $E_x$ is the expected value over all real data instances. $G(z)$ is the generator's output when given noise z. $D(G(z))$ is the discriminator's estimate of the probability that a fake instance is real. $E_z$ is the expected value over all random inputs to the generator (in effect, the expected value over all generated fake instances $G(z)$). The formula is derived from the cross-entropy between the real and generated distributions.

In the example shown in FIG. 1A, the loss function 116a provides inputs 146, 148 to the generator 112a and the discriminator/critic 114a, and the loss function 116b provides inputs 150, 152 to the generator 112b and the discriminator/critic 114b.

Generative adversarial networks (GANs) employ generative modeling that uses deep learning methods such as convolutional neural networks (e.g., within the generator 112). Generative modeling is an unsupervised learning task in machine learning that can be automatically configured and trained using malware code (as well as non-malware code) such as to generate or output new examples that plausibly could have been drawn from the original dataset.

To do so, the GANs, e.g., of FIG. 1A, frames the problem as a supervised learning problem using two sets of two sub-models: first, two code generator models (e.g., executing in modules 112a, 112b) that are configured to generate new synthetic examples of data/instruction code, and second, two discriminator models (e.g., executing in modules 114a, 114b) that are configured to classify the synthetic examples as either real (from the domain) or fake (generated). Each of sets of two sub-models is trained together, in some embodiments, in a zero-sum game in an adversarial manner through the use of a loss function 116 (e.g., 116a, 116b) until at least one, or all, of the discriminator models (e.g., of module 114a, 114b) is fooled, e.g., about half the time, meaning the generator model (e.g., of module 112a, 112b) is generating plausible examples of malware code or non-malware code. Once trained, the two code generator models 112a, 112b (shown as 112a' and 112b') can then be used to generate synthetic malware code 120 and synthetic non-malware code 122, respectively, to train or configure the anti-malware engine (e.g., 104a). In the example shown in FIG. 1A, a portion (or all) of the one or more libraries of malware code 108 (shown as 108a') and one or more libraries of non-malware code 110 (shown as 110a') may also be used for the training or configuration of the anti-malware engine (e.g., 104a).

While the synthesized data/sample may not necessarily execute as functional executable instructions on a machine, the synthesized data/sample as generated by the trained generator (e.g., 112) would have a similar data structure and pattern to those of executable instructions and would otherwise be suitable to train a subsequent deep learning system (e.g., 104) for an antimalware application.

GAN's generator models (e.g., executing in module 112), in operating in this adversarial configuration with the discriminator (e.g., 114), can generate data with similar characteristics as the real input data allowing the system to learn specific malware code or non-malware code that vary from the baseline non-malware code. Examples of GANs that may be employed include those described in Creswell, Antonia, et al. "Generative adversarial networks: An overview," IEEE Signal Processing Magazine 35.1: 53-65 (2018), which is incorporated by reference herein in its entirety.

As noted, the malware and non-malware codes 108, 110 may be binary files or snippets/portions of binary files. The adversarial machine learning model 106a may parse the binary files to provide a binary segment comprising the malware code portion. The parsed binary files may have the same binary length among the training data.

Notably, the exemplary system and method facilitate the technical problem associated with the meaningful availability of training malware data that can be used to train a deep learning system (e.g., CNN) with sufficient generalization and avoid overfitting. The exemplary system and method address this technical issue by providing a system that can train or employ a deep learning system to train using non-malware code to which anomalies such as malware can be detected and to which training or configuration of the second generative adversarial network can be used to enhance the first generative adversarial network. There is a vast availability of non-malware code, e.g., working source libraries (e.g., GitHub). To ensure proper training, the non-malware code may be reviewed to ensure that malware is not present.

In the example shown in FIG. 1A, the multiple adversarial machine learning models 106 are configured to operate independently of one another to provide synthetic malware code 120 and synthetic non-malware code 122 to the training (124) of the antimalware classification and/or detection application 102a executing on the anti-malware engine (e.g., 104a).

Once the classifier engine 104a is trained, the antimalware classification and/or detection application 102a may be distributed to clients (not shown—see FIG. 3) that can then provide runtime functionality 126 to provide an output 128 corresponding to the presence and/or non-presence of malware in an unknown code 130.

Figure 4A:
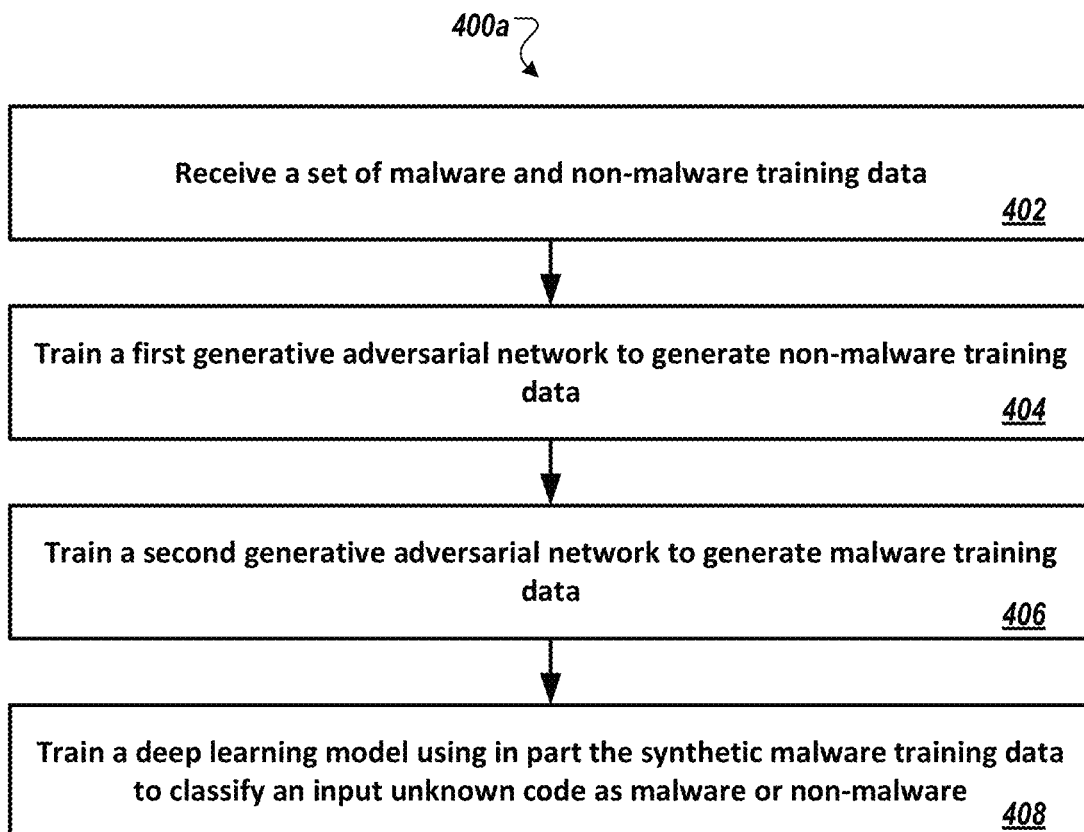
FIGS. 4A, 4B, and 4C each shows an example method of generating training data set for training an antimalware machine-learning model in accordance with an illustrative embodiment.

Example Method of Operation. FIG. 4A shows an example method 400 (shown as 400a) of generating training data set for training an antimalware machine-learning model in accordance with an illustrative embodiment. The method 400a includes receiving (402) a set of malware and non-malware training data.

The method 400a then includes generating (404) a first generative adversarial network (GAN) using a first library of malware training sets comprising a plurality of malware code.

The method 400a then includes generating (406) a second generative adversarial network (GAN) using a second library of non-malware training sets comprising a plurality of instruction code.

The method 400a then includes training (408) a deep learning model using in part the synthetic malware training data to classify an input unknown code as malware or non-malware. The training operation (408) may include (i) generating, via the first generative adversarial network, a first set of synthetic malware code and (ii) generating, via the second generative adversarial network, a second set of synthetic non-malware code. The operation may then include generating the antimalware machine-learning model using, at least, the first set of synthetic malware code and the second set of synthetic non-malware code, wherein the antimalware machine-learning model is employed in an antimalware application.

In some embodiments, the synthetic-malware code may be used to train the deep learning malware classifier to determine if the input code 130 is malware.

In some embodiments, the synthetic non-malware code may be used to train a deep learning malware classifier that can determine if an input code 130 is non-malware.

Example #2

Figure 1B:
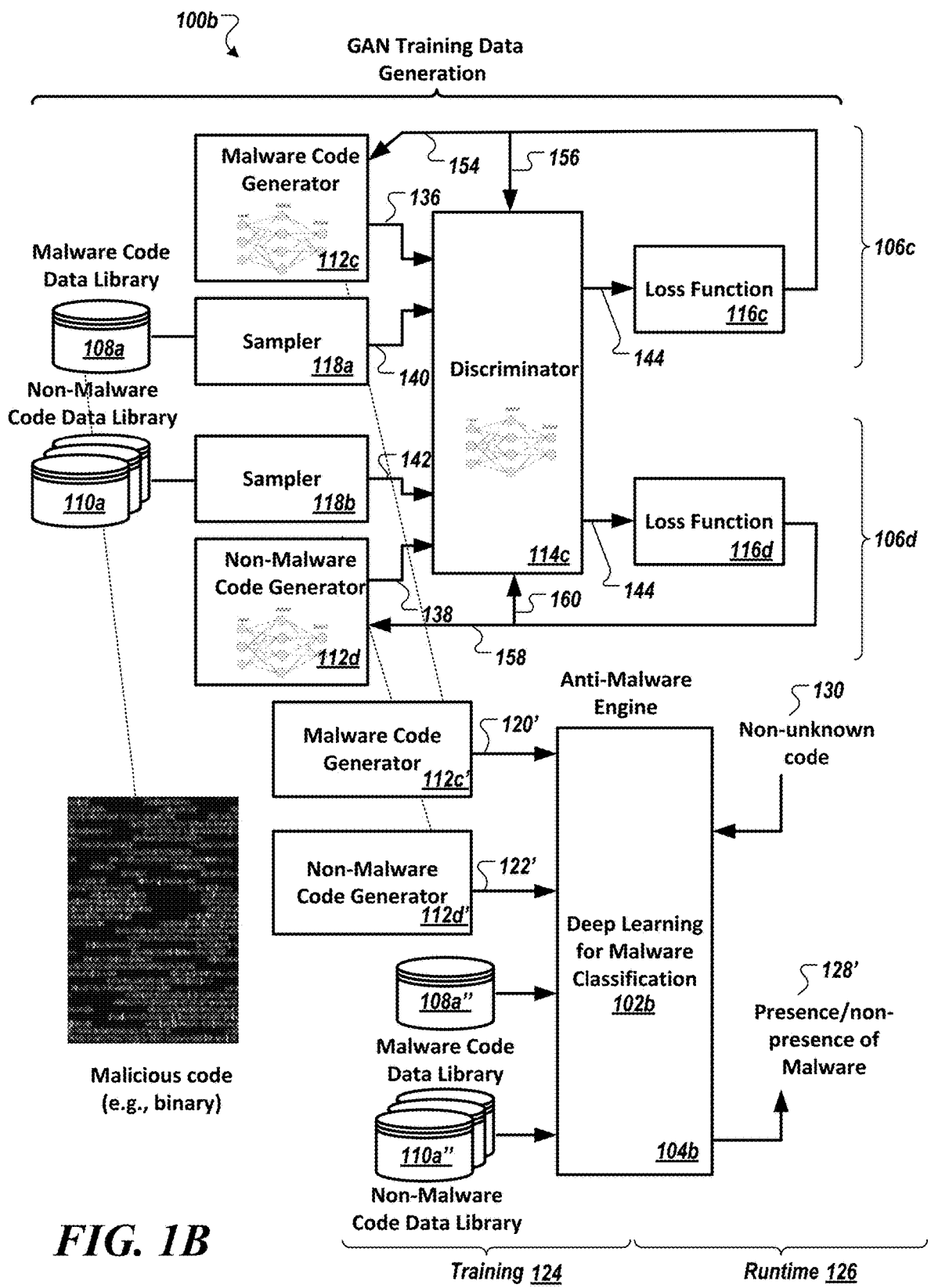

FIG. 1B shows another example antimalware application system 100 (shown as 100b) comprising antimalware application 102 (shown as "Deep Learning Malware Classification" 102b) executing in an anti-malware engine 104 (shown as 104b) that is configured directly or indirectly from data generated by an adversarial machine learning model 106 (shown as 106c, 106d) in accordance with an illustrative embodiment.

In the example shown in FIG. 1B, the adversarial machine learning model(s) 106 include (i) a first adversarial machine learning model 106c that is trained using one or more libraries of malware code 108 (shown as "Malware Code Data Library" 108a) and (ii) a second adversarial machine learning model 106d that is trained using one or more libraries of non-malware code 110 (shown as "Non-Malware Code Data Library" 110a) in which the multiple adversarial machine learning models 106c, 106d share components. The adversarial machine learning model(s) 106 are used as part of a data generation system 111 (shown as "GAN Training Data Generation" system 111a), e.g., as described in relation to FIG. 1A.

Each of the first and second adversarial machine learning models 106c, 106d includes a code generator module 112 (shown as "Malware Code Generator" module 112a, and "Non-Malware Code Generator" module 112b, respectively), a loss function 116 (shown as 116a, 116b), and a sampler module 118 (shown as 118a, 118b). However, in the example shown in FIG. 1B, the first and second adversarial machine learning models 106a, 106b employ a shared discriminator module 114 (shown as 114c) in that a single neural network, LTMS, or another machine learning/AI network as disclosed herein is employed in the module 114c.

As discussed above, the code generator module 112 (e.g., 112c or 112d) may employ a deep learning system, such as a neural network, that is configured to generate synthetic training data for the training of the anti-malware engine 104b. The sampler module 118 (e.g., 118a or 118b) is configured, in an embodiment, to randomly sample data from a data library (e.g., 108 or 110) and provide the sampled data as input 140, 142 to the discriminator 114 (e.g., 114c).

In this example, the discriminator (e.g., 114c) is configured to receive samples as its input from either one of the generators (112c or 112d) (inputs 136, 142) or the samplers (118a or 118b) (inputs 140, 142) and to classify the input (136, 138, 140, 142) as being a real or a fake input. Based on the classification, the discriminator (114c) provides the outputs 144 to the loss functions (116c, 116d). Because of the different input types, a discriminator 114c provides outputs 144 to different loss functions (shown as modules 116c, 116d). In some embodiments, the same type of loss function equations may be employed in loss functions 116c and 116d. In other embodiments, loss function 116c may employ a first loss function equation, and loss function 116d may employ a second loss function equation in which the first and second loss function equations are of different types. Examples of loss functions include a minimax loss function, a modified minimax loss function, a Wasserstein loss function, or other loss functions of other neural network or machine learning models described or incorporated by reference herein.

To account for the larger database of training data in data store 110a (e.g., as compared to 108a), the selector (not shown) of the discriminator 114c may have different sampling distributions according to the size of the training data sets. Indeed, because the non-malware data set is larger, the discriminator 114c may sample more frequently from the non-malware data set to learn or establish correlations for a non-malware instruction code as a normal non-anomalous instruction code. The malware data set may be employed to confirm that the discriminator 114c can determine that this input (136, 140) is properly classified as an anomaly.

The GAN employs supervised learning using two submodels: first, the two code generator models (e.g., executing in modules 112c, 112d) that are configured to generate new synthetic examples of data/instruction code, and a discriminator model (e.g., executing in module 114c) that is configured to classify the synthetic examples as either real (from the domain) or fake (generated). The two models are trained together, in some embodiments, in a zero-sum game in an adversarial manner, through the use of a loss function (116c, 116d), until the discriminator model (e.g., of module 114c) is fooled, e.g., about half the time, meaning the generator model (e.g., of module 112c, 112d) is generating plausible examples of malware code or non-malware code.

Once the GANs are trained, the code generator models 112c, 112d (shown as 112c' and 112d') can then be used to generate synthetic malware code 120' and synthetic non-malware code 122', respectively, to train or configure the anti-malware engine (e.g., 104b). In the example shown in FIG. 1B, a portion (or all) of the one or more libraries of malware code 108a (shown as 108a'') and one or more libraries of non-malware code 110 (shown as 110a'') may also be used for the training or configuration of the anti-malware engine (e.g., 104b).

While the synthesized data/sample may not necessarily execute as functional executable instructions on a machine, the synthesized data/sample as generated by the trained generator (e.g., 112) would have a similar data structure and pattern to those of executable instructions and would otherwise be suitable to train a subsequent deep learning system (e.g., 104) for an antimalware application.

Once the classifier engine 104b is trained, the antimalware classification and/or detection application 102a may be distributed to clients (not shown—see FIG. 3) to provide runtime functionality 126 to provide an output 128 (shown as 128') corresponding to the presence and/or non-presence of a malware in an unknown code 130.

In the example shown in FIG. 1B, the loss function 116c provides inputs 154, 156 to the generator 112c and the discriminator/critic 114c, and the loss function 116d provides inputs 158, 160 to the generator 112d and the discriminator/critic 114c. The discriminator 114c may take an average or a weighted combination of the inputs 156, 160 from the loss functions 116c, 116d to adjust the weights or configurations of the discriminator/critic to maximize its function.

In some embodiments, two or more adversarial machine learning models may be trained based on different types of malware code, e.g., trojan, bloatware, spyware.

Figure 4B:
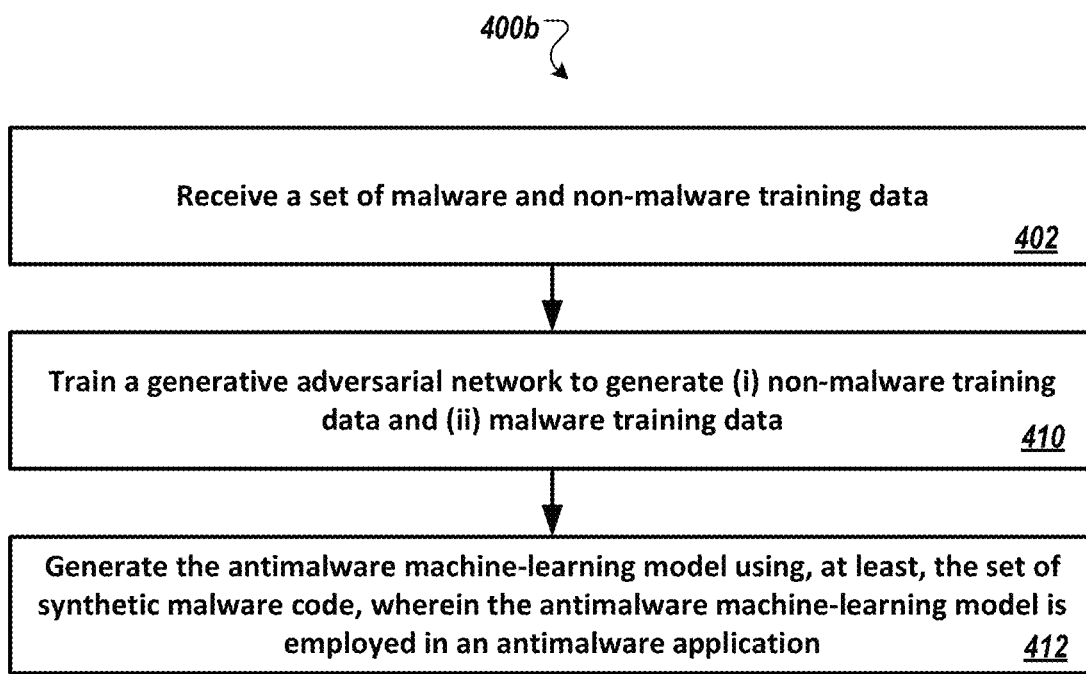

Example Method of Operation. FIG. 4B shows another example method 400 (shown as 400b) of generating training data set for training an antimalware machine-learning model in accordance with an illustrative embodiment.

The method 400b includes receiving (402) a set of malware and non-malware training data. The method 400b then includes generating (404) a generative adversarial network (GAN) using (i) a first library of malware training sets comprising a plurality of malware instruction code and (ii) a second library of non-malware training sets comprising a plurality of non-malware instruction code. The method 400b then includes generating (410), via the first generative adversarial network, a set of synthetic malware codes. The method 400b then includes generating (412) the antimalware machine-learning model using, at least, the set of synthetic malware code, wherein the antimalware machine-learning model is employed in an antimalware application.

In the example shown in FIG. 1B, the generative adversarial network includes a single discriminator/critic (e.g., 114c) that operates with two or more generators (e.g., 112c, 112d) that are connected to the data stores (e.g., 108a, 110a) containing the malware instruction code or non-malware instruction code.

Example #3

Figure 1C:
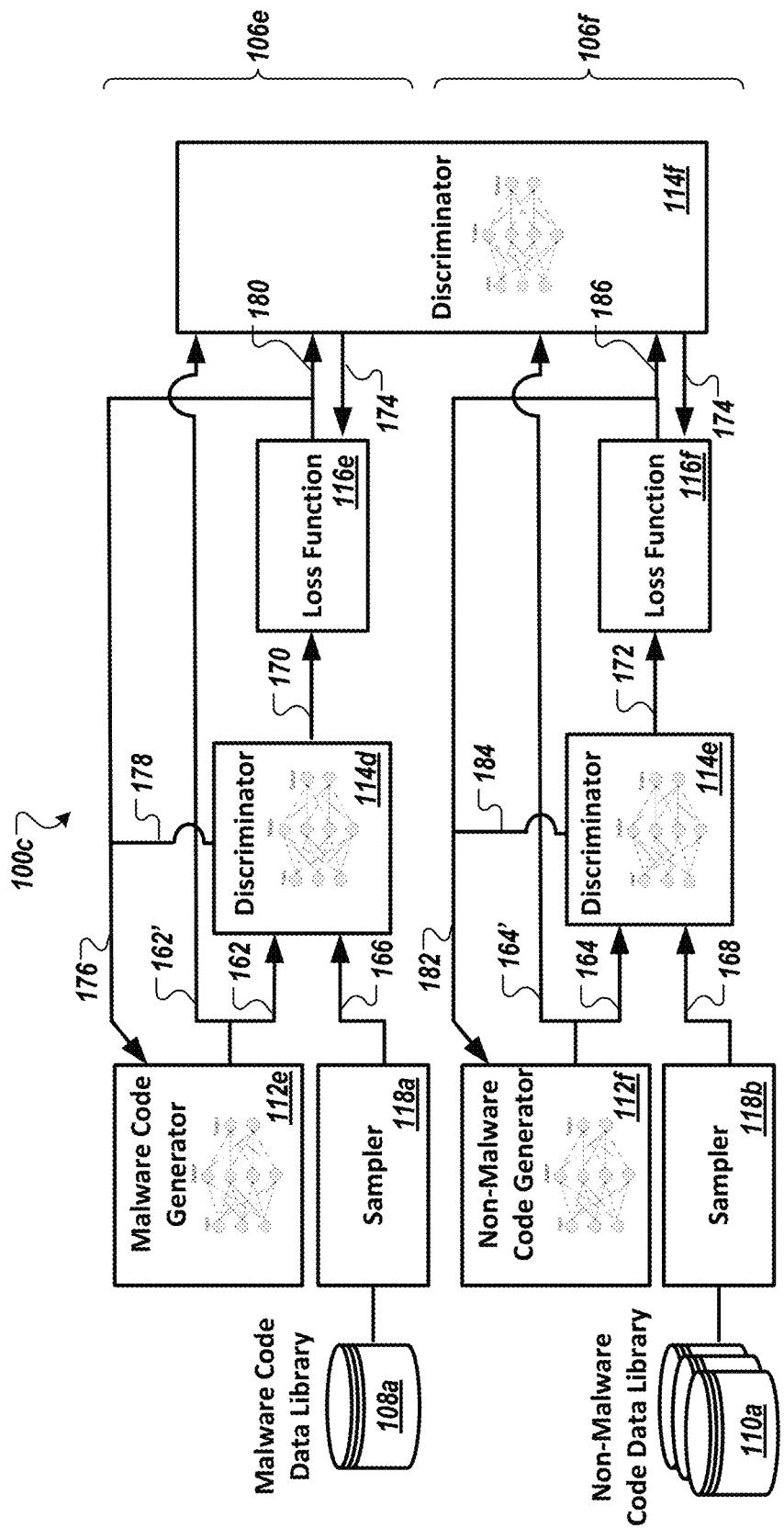

FIG. 1C shows another example antimalware application system 100 (shown as 100c) comprising antimalware application 102 (e.g., 102c, not shown) executing in an antimalware engine 104 (e.g., 104c, not shown) that is configured directly or indirectly from data generated by adversarial machine learning models 106 (shown as 106e, 106f) in accordance with an illustrative embodiment.

In the example shown in FIG. 1C, the adversarial machine learning models 106 include (i) a first adversarial machine learning model 106e that is trained using one or more libraries of malware code 108 (shown as "Malware Code Data Library" 108a) and (ii) a second adversarial machine learning models 106f that is trained using one or more libraries of non-malware code 110 (shown as "Non-Malware Code Data Library" 110a) in which the multiple adversarial machine learning models 106e, 106f share a separate third discriminator module 114 (shown as 114f).

That is, each of the first and second adversarial machine learning models 106e, 106f includes a code generator module 112 (shown as "Malware Code Generator" module 112e, and "Non-Malware Code Generator" module 112f, respectively), a loss function 116 (shown as 116e, 116f), a discriminator 114 (shown as 114d, 114e), and a sampler module 118 (shown as 118a, 118b). In addition, in the example shown in FIG. 1C, the first and second adversarial machine learning models 106e, 106 employ a third discriminator module 114 (shown as 114f).

As discussed above, the code generator module 112 (e.g., 112e or 112f) may employ a deep learning system, such as a neural network, that is configured to generate synthetic data. The sampler module 118 (e.g., 118a or 118b) is configured, in an embodiment, to randomly sample data from a data library (e.g., 108 or 110) and provide the sampled data as inputs 166, 168 to the discriminator 114 (e.g., 114e, 114d).

In this example, the discriminators (e.g., 114d, 114e) are respectively configured to receive samples as their respective input from the generators (112e or 112f) (inputs 162, 164) or the samplers (118a or 118b) (inputs 166, 168) and to respectively classify the input (162, 166 and 164, 168, respectively) as being a real or a fake input. Based on the classification, the discriminators (114d, 114e) provide outputs (170, 172) to the loss functions (116e, 116f). In some embodiments, the same type of loss function equations may be employed in loss functions 116e and 116f In other embodiments, loss function 116e may employ a first loss function equation, and loss function 116f may employ a second loss function equation in which the first and second loss function equations are of different types. Examples of loss functions include a minimax loss function, a modified minimax loss function, a Wasserstein loss function, or other loss functions of other neural network or machine learning models described or incorporated by reference herein.

To couple the learning operation between the two adversarial machine learning models 106e, 106f, the training system employs a third, shared discriminator module 114f is employed that receives inputs 162, 164 (shown as 162', 164') from the generators 112e, 112f. The shared discriminator module 114f provides outputs 174 to the loss functions 116e, 116f that combines the inputs 174 from the third discriminator 114f and the inputs 170, 172 from the respective discriminator 114d, 114e.

In the example shown in FIG. 1C, the first loss function 116e provides inputs (176, 178, 180, respectively) to the generator 112e, the discriminator 114d, and the shared discriminator 114f. The second loss function 116f provides inputs (182, 184, 186, respectively) to the generator 112f, the discriminator 114e, and the shared discriminator 114f.

The GAN employs supervised learning using two sets of sub-models: first, the two code generator models (e.g., executing in modules 112d, 112e) that are configured to generate new synthetic examples of data, and the three discriminator models (e.g., executing in module 114d, 114e, 114f) that are configured to classify these synthetic examples as either real (from the domain) or fake (generated). The two generators and three discriminator models are trained together, in some embodiments, in a zero-sum game in an adversarial manner, through the use of the loss functions (116e, 116f), until at least one, or all, of the discriminator models (e.g., of module 114d, 114e, 114f) is fooled, e.g., about half the time, meaning the generator models (e.g., of module 112e, 112f) are generating plausible examples of malware code or non-malware code.

Once the GANs are trained, the code generator models 112e, 112f can then be used to generate synthetic malware code 120 and synthetic non-malware code 122, respectively, to train or configure the anti-malware engine (e.g., 104c, not shown). In the example shown in FIG. 1C, a portion (or all) of the one or more libraries of malware code 108a and one or more libraries of non-malware code 110 may also be used for the training or configuration of the anti-malware engine (e.g., 104b).

Once the classifier engine 104c (not shown) is trained, the antimalware classification and/or detection application 102c (not shown) may be distributed to clients that can provide runtime functionality to provide an output corresponding to the presence and/or non-presence of malware in an unknown code 130.

In some embodiments, two or more adversarial machine learning models may be trained based on different types of malware code, e.g., trojan, bloatware, spyware.

Loss function example #3. Wasserstein Loss function employs a separate loss function for the generator 112 (e.g., 112e, 112f) and the discriminator 114 (e.g., 114d, 114e, 114f) (also referred to as a "critic" in certain implementations). The critic loss function has the form per Equation 3:

$$\frac{D_1(x) * D_2(x) - D_1\left(\frac{G_1(z) * G_2(Z)}{2}\right) * D_2\left(\frac{G_1(z) * G_2(Z)}{2}\right)}{2} \quad \text{(Eq. 3)}$$

The critic loss function is employed to adjust the weights or configurations of the discriminator/critic to maximize its function. The generator loss function is employed to adjust the weight or configurations of the generator 112 and has the form:

$$D_1\left(\frac{G_1(z) * G_2(Z)}{2}\right) * D_2\left(\frac{G_1(z) * G_2(Z)}{2}\right).$$

In these functions, $D_1(x)$ is the critic's output from the critic/discriminators (114d, 114e) for a real instance, and $D_2(x)$ is the critic's output from the shared critic/discriminator 114df for a real instance. $G_1(z)$ and $G_2(z)$ are the generators' output when given noise z. $D_1(G(z))$ is the critic's output for a fake instance from the critic/discriminators (114d, 114e), and $D_2(G(z))$ is the critic's output for a fake instance from shared critic/discriminators (114f). For the adversarial machine learning models 106e, 106f to employ both the outputs from each respective discriminator (114d, 114e) and the shared discriminator (114f), the outputs may be averaged (e.g., $D_1(x)$ and $D_2(x)$ are combined, and $D_1(G(z))$ and $D_2(G(z))$ are combined). Equation 3 combines the outputs of the loss functions as an average function. In other embodiments, a weighted combination may be employed.

Figure 4C:
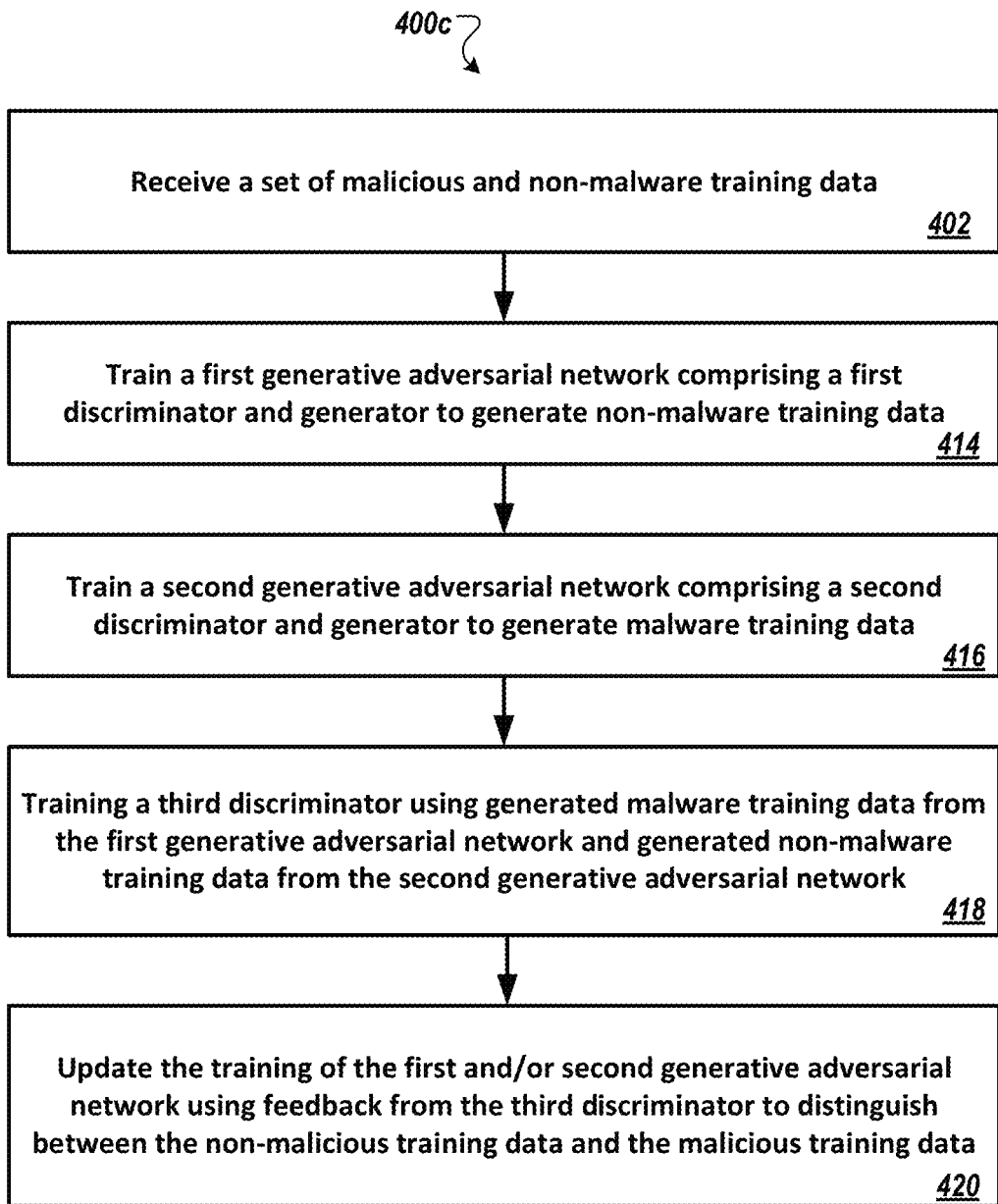

Example Method of Operation. FIG. 4C shows another example method 400 (shown as 400c) of generating training data set for training an antimalware machine-learning model in accordance with an illustrative embodiment.

The method 400c includes receiving (402) a set of malicious and non-malicious training data. The method 400c includes generating a GAN architecture that includes (i) a first discriminator to configure a first generator that generates malware code, (ii) a second discriminator to configure a second generator that generates non-malware code, and (iii) a third discriminator to also configure the first and second generator, wherein the third discriminator shares the loss function components as the first discriminator and second discriminator.

In the example shown in FIG. 4C, the method 400c includes training (414) a first generative adversarial network comprising a first discriminator and generator to generate non-malicious training data. The method 400c then includes training (416) a second generative adversarial network comprising a second discriminator and generator to generate malicious training data. The method 400c then includes training (418) a third discriminator using generated malicious training data from the first generative adversarial network and generated non-malicious training data from the second generative adversarial network. The method 400c then includes updating (420) the training of the first and/or second generative adversarial network using feedback from the third discriminator to distinguish between the non-malicious training data and the malicious training data.

Example GAN Architecture and Learning

Supervised Learning

Figure 2A:
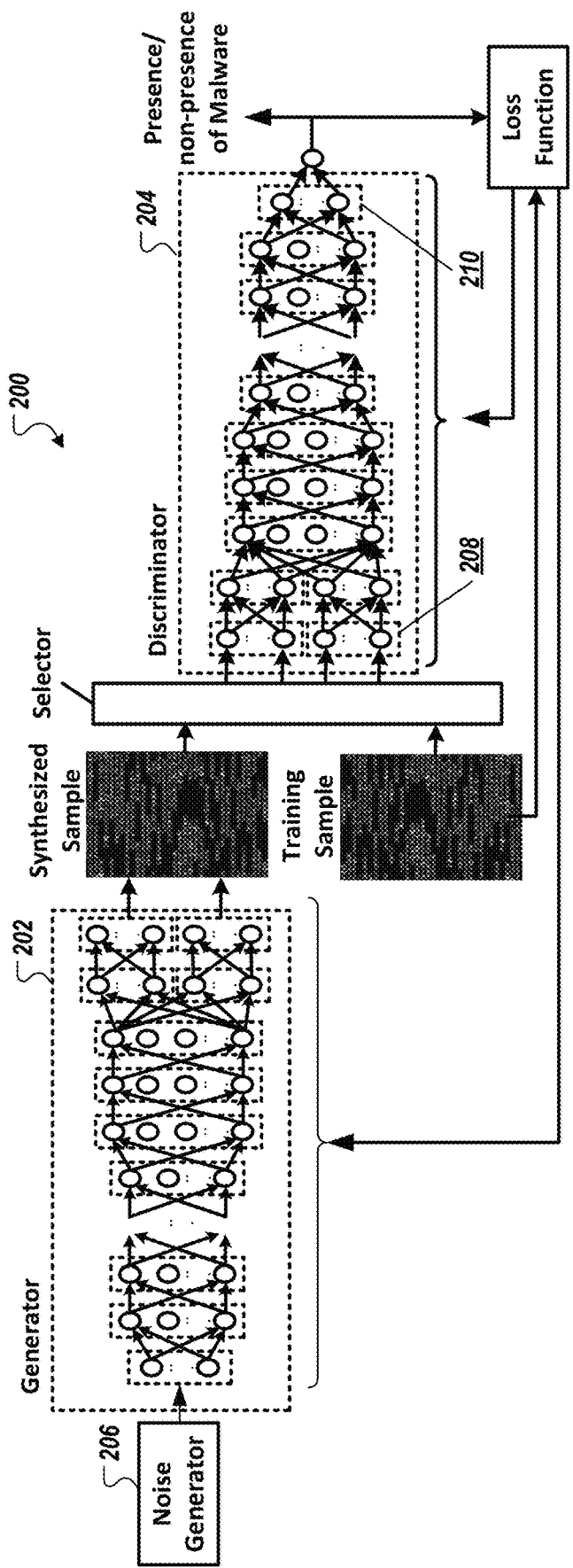
FIGS. 2A and 2B each shows an example implementation of a GAN-based neural network in accordance with an illustrative embodiment.
Figure 2B:
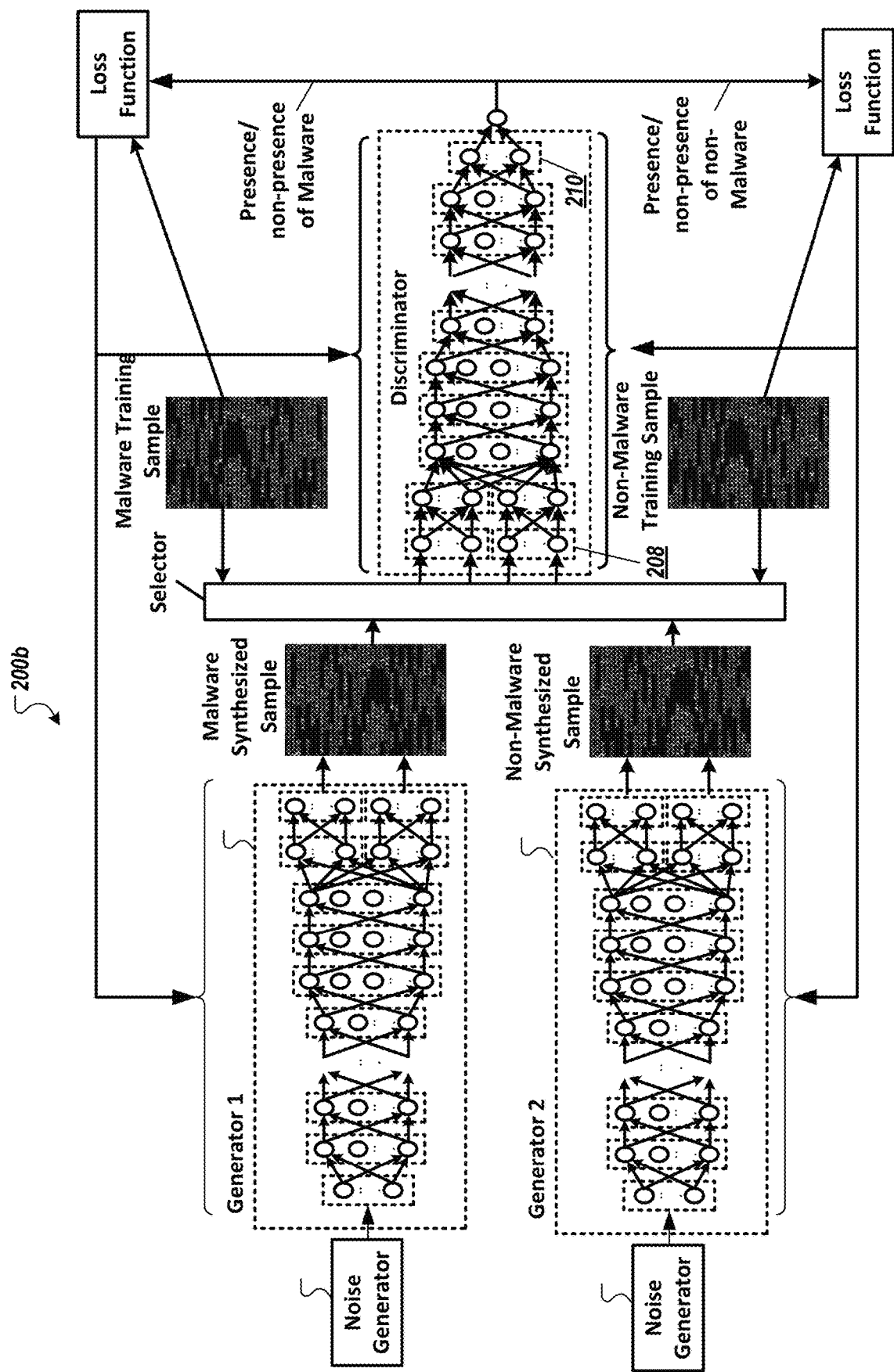

FIG. 2A shows an example implementation of a GAN-based neural network 200, e.g., in a self-supervised learning system. The GAN-based neural network 200 is configured to perform unsupervised learning by setting up its components, namely the discriminator (e.g., 114) (shown as 204) and generator (e.g., 112) (shown as 202), within a supervised learning problem that generate, via the generator (e.g., 112), intermediate (fake)/random malware code or non-malware code and employs the discriminator (e.g., 114) to determine if the synthesize data/sample is deemed real or fake. To this end, while the discriminator and generator (e.g., 112, 114) are individually configured via supervised learning operations, but in combination, they can perform the supervised learning operations in an unsupervised learning manner through concerted operations with each other. While the synthesized data/sample may not necessarily execute as functional executable instructions on a machine, once the learning has been completed, the synthesized data/sample as generated by the generator (e.g., 112) would have a similar data structure and pattern to those of executable instructions and would otherwise be suitable to train a subsequent deep learning system (e.g., 104) for an antimalware application.

In the example shown in FIG. 2A, a classifier (e.g., discriminator 114) of the GAN-based neural network 200 is based on supervised learning, which is trained on a dataset with labels to classify the given antimalware. The learning system can extract static features and statistical characteristics from the training data set. In FIG. 2A, the generator 202 operates with a noise generator 206.

This disclosure contemplates that the machine learning model can be any supervised learning model, semi-supervised learning model, or unsupervised learning model. The machine learning model is preferably a deep learning model. As noted above, the GAN architecture in having the discriminator and generator operate in concert with one another can perform supervised learning in an unsupervised manner. Indeed, the discriminator and generator can also be individually configured in a supervised manner or semi-supervised manner. Machine learning models are known in the art and are therefore not described in further detail herein.

In a supervised learning model, the model learns a function that maps an input (also known as feature or features) to an output (also known as target or target) during training with a labeled data set (or dataset). In an unsupervised learning model, the model learns a function that maps an input (also known as feature or features) to an output (also known as target or target) during training with an unlabeled data set. In a semi-supervised model, the model learns a function that maps an input (also known as feature or features) to an output (also known as the target) during training with both labeled and unlabeled data.

In FIG. 2A, the supervised learning models of the discriminator 204 and generator 202 may employ an artificial neural network (ANN). In a supervised learning model of FIG. 2A, the model learns a function that maps an input (also known as feature or features) to an output (also known as target or target) during training with a labeled data set (or dataset). In an unsupervised learning model, the model learns a function that maps an input (also known as feature or features) to an output (also known as target or target) during training with an unlabeled data set. Here, the model of the generator 202 is trained to generate a new sample as its output, and the discriminator 204 is configured to classify the new sample as either real (from the domain) or fake (synthesized). The two models are trained together in a zero-sum operation in an adversarial manner until the discriminator 204 is fooled about half the time.

An artificial neural network (ANN) of the discriminator 204 and generator 202 each includes a plurality of interconnected neurons (e.g., also referred to as "nodes"). The nodes can be arranged in a plurality of layers such as an input layer, output layer, and optionally one or more hidden layers. An ANN having hidden layers can be referred to as a deep neural network or multilayer perceptron (MLP). Each node is connected to one or more other nodes in the ANN. For example, each layer is made of a plurality of nodes, where each node is connected to all nodes in the previous layer. The nodes in a given layer are not interconnected with one another, i.e., the nodes in a given layer function independently of one another. As used herein, nodes in the input layer receive data from outside of the ANN, nodes in the hidden layer(s) modify the data between the input and output layers, and nodes in the output layer provide the results. Each node is configured to receive an input, implement an activation function (e.g., binary step, linear, sigmoid, tanH, or rectified linear unit (ReLU) function), and provide an output in accordance with the activation function. Additionally, each node is associated with a respective weight. ANNs are trained with a dataset to maximize or minimize an objective function. In some implementations, the objective function is a cost function or loss function, which is a measure of the ANN's performance (e.g., error such as L1 or L2 loss) during training, and the training algorithm tunes the node weights and/or bias to minimize the cost function. This disclosure contemplates that any algorithm that finds the maximum or minimum of the objective function can be used for training the ANN. Training algorithms for ANNs include, but are not limited to, backpropagation. It should be understood that an artificial neural network is provided only as an example machine learning model. This disclosure contemplates that the machine learning model can be any supervised learning model, semi-supervised learning model, or unsupervised learning model. Optionally, the machine learning model is a deep learning model. Machine learning models are known in the art and are therefore not described in further detail herein.

In yet another example, the supervised learning models of the generator 202 may employ a recurrent neural network (RNN) employing a long short-term memory (LSTM) (not shown). An LSTM network can remember information over long time intervals. The LSTM network can be employed for certain malware or non-malware code type to determine a pattern in such code.

An LSTM network can include (i) a sigmoid nonlinearity function "a" that can output a value to describe how much of each component should be let through, (ii) a tanh operator that provides hyperbolic tangent nonlinearity functions. The LSTM network can employ a forget gate, an input gate, and an output gate that employs these operators. The input gate may include two inputs, a first that connects to a sigmoid operator that connects to a multiplier. The multiplier provides an output for the input gate that operates on the input from the sigmoid operator and receives the second input for the input gate as a previous cell state, $c_{t-1}$. The forget gate may include three inputs and an output. The first input may connect to a sigmoid operator, the second input may connect to a tanh operator, and the third input may connect to an addition operator. The outputs of the tanh operator and the sigmoid operator may be connected to the inputs of a multiplier operator. The output of the multiplier operator is provided to the addition operator that is an output of the forget gate as the updated cell state, $c_t$. The addition operator may receive as a first input from the output of the input gate (i.e., the output of the multiplier of the input gate) and a second input from the output of the multiplier. The output gate may include 2 inputs and 2 outputs. The first input may connect to a sigmoid operator, and the second input may be the output of the forget gate (i.e., the output of the addition operator). The sigmoid operator is connected to a multiplier operator that connects, as a second input, to the tanh operator that connects to the output of said forget gate. The output of the multiplier operator is the hidden state, $h_t$. The input to the LSTM cell, $x_t$, can be added with the previous hidden state, $h_{t-1}$, and passed to the forget gate, the input gate, and the output gate. The previous cell state, $c_{t-1}$, can be updated by the forget gate and the input gate with relevant old information and new current information, respectively. The updated cell state, $c_t$, along with the previous hidden state, $h_{t-1}$, and the current input, $x_t$, can be used to generate the new hidden state, $h_t$, as the output. Multiple LSTM cells can be connected in parallel or series.

In addition to supervisory learning, other learning methodologies may be employed such as reinforcement learning. Reinforcement learning can train an AI agent through a neural network that continuously interacts with a training code, e.g., malware code or non-malware code. Each of the GAN-based neural networks includes an environment and an actor. Examples of deep Q-learning operations for GAN-based neural network is provided in Z. Fang, J. Wang, B. Li, S. Wu, Y. Zhou and H. Huang, "Evading Anti-Malware Engines With Deep Reinforcement Learning," in IEEE Access, vol. 7, pp. 48867-48879, 2019, doi: 10.1109/AC-CESS.2019.2908033, which is incorporated by reference herein.

Example Anti-Malware Cloud Platform

Figure 3:
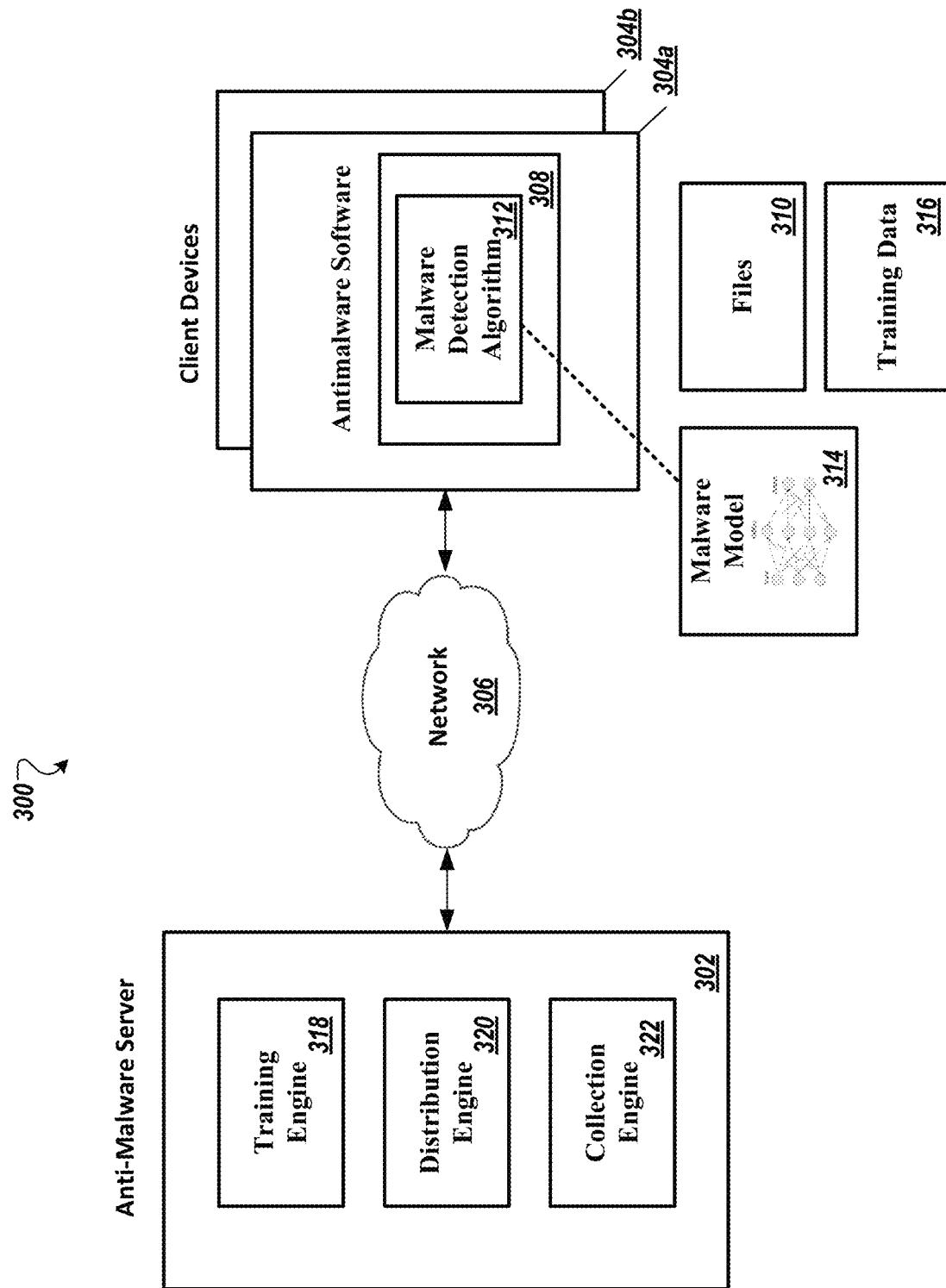
FIG. 3 is an example cloud computing environment 300 for detecting malware in files in accordance with an illustrative embodiment.

FIG. 3 is an example cloud computing environment 300 for detecting malware in files in accordance with an illustrative embodiment. As shown, the environment 300 includes an anti-malware server 302 in communication with one or more client devices 304 (shown as 304a, 304b) through a network 306. The network 306 may include a combination of public and private networks. Each of the antimalware server 302 and client devices 304 may be implemented using one or more general-purpose computing devices or a specialized server or a computing device. For example, in some embodiments, the client service 304 may be implemented as a router, switch, firewall device, or other network devices. In some embodiments, the client device 304 may be implemented as a data storage device or real-time controller. Moreover, in some embodiments, the antimalware server 302 may be implemented in a cloud-based computing environment.

The client device 304 may include antimalware software 308 that detects the presence (or absence) of malware in files 310. As shown, the antimalware software 308 uses a detection algorithm 312 to detect malware in files 310. As will be described in further detail below, the detection algorithm 312 uses a malware model 314 (models of previously referred Deep Learning Malware Classification 102a, 102b, 102c, e.g., neural network model or other machine learning model described herein) to detect malware in files 310. A malware model 314 may output a probability that a file 310 contains or is malware using only features of the file 310. The models 314 may be machine learning or other AI models trained to identify malware by the antimalware server 302.

As may be appreciated, because executing a file 310 that contains malware has inherent risks to both the client device 304 and the network 306, when a file 310 is first received or downloaded by the client device 304, the antimalware software 308 may first use the detection algorithm 312 to determine a probability that the file 310 includes (or does not include malware). If the determined probability shows that file 310 contains malware, the antimalware software 308 may update the malware status of the file 310 to "malware" and may take one or more actions. These actions may include alerting the user of the client device 304, deleting the file 310, or attempting to clear or remove the malware from the file 310. Depending on the embodiment, the antimalware software 308 may maintain a table, list, or other data structure that includes a malware status for each file 310 downloaded, stored, or available to the client device 304.

The malware model 314 may determine a probability that indicates that the file 310 contains malware when the probability is above a threshold. The threshold may be set by a user, administrator, or the malware model 314 itself. If the determined probability shows that file 310 does not contain malware, the antimalware software 308 may update the malware status of the file 310 to "not malware." Later, when a user of the client device 304 attempts to execute or use the file 310, the antimalware software 308 may look up the malware status of the file 310 and may determine that the file 310 is safe to use.

In some cases, the determined probability for a file 310 by the detection algorithm 312 may be inconclusive in that it does not clearly indicate whether or not the file 310 is malware or not malware. In such scenarios, the antimalware software 308 may update the malware status of the file 310 to "inconclusive." In addition, the software 308 may alert the user of the client device 304 that the software 308 was unable to determine if the file 310 was or was not malware. The determined probability may be inconclusive when the probability is below the first threshold but above the second threshold.

The antimalware software 308 may provide the training data 316 to the antimalware server 302, which may use the training data 316 received from the client device 304, along with training data 316 received from other client devices 304, to retrain or update the malware model 314. The antimalware server 302 may then distribute the retrained and updated malware model 314 to the various client devices 304. Depending on the embodiment, the antimalware server 302 may also update and redistribute the malware model 314 to the client devices 304.

The antimalware server 302 may include several components including, but not limited to, a training engine 318 (previously referred to as the GAN Training Data Generation" system 111a, e.g., of FIG. 1A, 1B, or 1C), a distribution engine 320, and a collection engine 322. More or fewer components may be supported. Each of the components of the antimalware server 302 may be implemented together or separately using one or more general-purpose computing devices.

The training engine 318 may train one or both of the malware model 314 using training data 316. Initially, the training data 316 may be training data 316 that was collected and labeled by one or more reviewers. The training data 316 may include sets of features extracted from files 310 that are known to be associated with or include malware and sets of features extracted from files that are known not to be associated with or include malware. The features may be used to train the malware model 314 using machine learning or other data modeling or predictive analytic techniques. Suitable types of models include neural networks and transformers, for example. After the training engine 318 generates the malware model 314, the distribution engine 320 may distribute the generated models through the network 306 to instances of the antimalware software 308 executing on each of a plurality of client devices 304. Each instance of the antimalware software 308 may receive the malware model 314 and may use the malware model 314 as part of the detection algorithm 312.

In some embodiments, when a user installs the antimalware software 308 on their client device 304, the malware model 314 may be included in the application package that is installed on the client device 304. Alternatively, after the antimalware software 308 is installed on the client device 304, the antimalware software 308 may download the malware model 314 from the distribution engine 320 through the network 306.

The collection engine 322 may collect and receive training data 316 generated by some or all of the instances of the antimalware software 308 executing on the client devices 304.

In some embodiments, the collection engine 322 may receive the additional training data 316 from each of the instances of the antimalware software 308. For example, after executing a file 310 with an inconclusive malware status, the antimalware software 308 may transmit the training data 316 comprising the file 310 (or features extracted from the file 310) to the collection engine 322.

In other embodiments, each instance of the antimalware software 308 may generate and store training data 316 and may transmit the training data 316 to the collection engine 322 in batches. For example, the antimalware software 308 may transmit the training data 316 to the collection engine 322 after the size of the training data 316 reaches a threshold or after a threshold amount of time has passed since the last set of training data 316 was transmitted to the collection engine 322. Alternatively, or additionally, the collection engine 322 may periodically request the training data 316 from each instance of the antimalware software 308 (e.g., every day, week, or month). Each instance of the antimalware software 308 may then transmit its training data 316 in response to the request.

The training engine 318 may use the received training data 316 to retrain or update the malware model 314. Depending on the embodiment, the training engine 318 may retrain the malware model 314 in response to the collection engine 322 receiving new training data 316, after some size or amount of training data 316 has been received by the collection engine 322, or after some threshold amount of time has passed since the malware model 314 was last retrained or updated. In addition, the training engine 318 may retrain the malware model 314 in response to a request or instruction from a user or administrator.

In some embodiments, the training engine 318 may retrain the malware model 314 using the training data 316 received from the instances of the antimalware software 322 in combination with some or all of the original training data 316 that was used to train the malware model 314. The training engine 318 may discard training data 316 that is older than some predetermined age threshold or other pruning criteria.

The distribution engine 320 may distribute an updated malware model 314 to the instances of the antimalware software 308 through the network 306. The instances of the antimalware software 308 may then begin using the updated malware model 314 in their detection algorithms 316.

Although example embodiments of the present disclosure are explained in some instances in detail herein, it is to be understood that other embodiments are contemplated. Accordingly, it is not intended that the present disclosure be limited in its scope to the details of construction and arrangement of components set forth in the following description or illustrated in the drawings. The present disclosure is capable of other embodiments and of being practiced or carried out in various ways.

Example Pre-Processing

In some embodiments, the collection engine (e.g., 322) is configured to collect code parts from publicly available open-source code repositories. The training engine (e.g., 318) can train a machine learning tool to create working code parts using databases of known malware applications, the code parts from publicly available open-source code repositories. The training engine (e.g., 318) can also train a machine learning tool to label malware code parts using databases of known malware applications and source codes from publicly available open-source code repositories.

Figure 5:
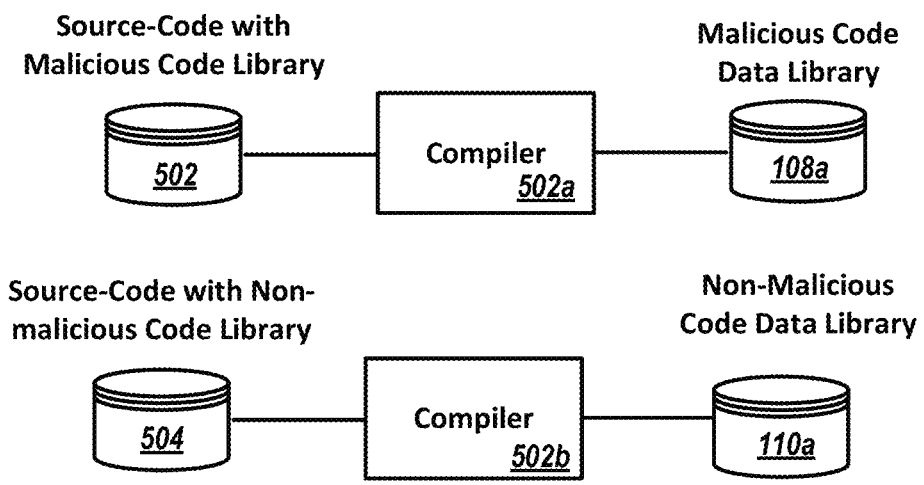
FIG. 5 shows an example operation of the training engine of FIG. 3 in accordance with an illustrative embodiment.

FIG. 5 shows an example operation of the training engine (e.g., 318) of FIG. 3 in accordance with an illustrative embodiment. The training engine (e.g., 318) may include one or more compilers 502 (shown as 502a, 502b) to convert (i) source code from a source-code library of malicious code (502) to one or more libraries of malware code 108a and/or (ii) source code from a source-code library of non-malware code (504) to one or more libraries of malware code 110a.

The libraries of malware code 110a and the libraries of non-malware code 108a may store the instruction codes as binary files. The binary files may be subsequently parsed, e.g., by the training engine (e.g., 318) to provide a binary segment comprising the malware code portion to the GAN training, e.g., as described in relation to FIGS. 1A, 1B, and 1C. The parsed binary files may have the same binary length for inputting to the generative adversarial networks and their associated training.

Example Computing Environment. An exemplary computing environment that may implement the anti-malware server or client device may include various numerous general purpose or special purpose computing devices environments or configurations. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media, including memory storage devices.

An exemplary system, in its most basic configuration, may include at least one processing unit and memory. A processing unit may include one or more processing elements (e.g., reduced instruction set computing (RISC) cores or complex instruction set computing (CISC) cores, etc.) that can execute computer-readable instructions to perform a pre-defined task or function. Depending on the exact configuration and type of computing device, memory may be volatile (such as random-access memory (RAM)), non-volatile (such as read-only memory (ROM), flash memory, etc.), or some combination of the two.

The computing device may have additional features/functionality. For example, the computing device may include additional storage (removable and/or non-removable), including, but not limited to, magnetic or optical disks or tape.

The computing device may include a variety of computer-readable media. Computer-readable media can be any available media that can be accessed by the device and includes both volatile and non-volatile media, removable and non-removable media.

Computer storage media include volatile and non-volatile, and removable and non-removable media implemented in any method or technology for storage of information such as computer-readable instructions, data structures, program modules, or other data. Memory, removable storage, and non-removable storage are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device. Any such computer storage media may be part of the computing device.

The computing device may contain communication connection(s) that allow the device to communicate with other devices. The computing device may also have input device (s) such as a keyboard, mouse, pen, voice input device, touch input device, etc. Output device(s) such as a display, speakers, printer, etc., may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

It must also be noted that, as used in the specification and the appended claims, the singular forms "a," "an," and "the" include plural referents unless the context clearly dictates otherwise. Ranges may be expressed herein as from "about" or "approximately" one particular value and/or to "about" or "approximately" another particular value. When such a range is expressed, other exemplary embodiments include from the one particular value and/or to the other particular value.

By "comprising" or "containing" or "including" is meant that at least the name compound, element, particle, or method step is present in the composition or article or method, but does not exclude the presence of other compounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the present disclosure. Similarly, it is also to be understood that the mention of one or more components in a device or system does not preclude the presence of additional components or intervening components between those components expressly identified.

What is claimed is:

1. A method to generate training data set for training an antimalware machine-learning model, the method comprising:

generating, by one or more processors, a first generative adversarial network (GAN) using a first library of malware training sets comprising a plurality of malware code;

generating, by the one or more processors, a second generative adversarial network (GAN) using a second library of non-malware training sets comprising a plurality of instruction code;

generating, by the one or more processors, via the first generative adversarial network, a first set of synthetic malware code;

generating, by the one or more processors, via the second generative adversarial network, a second set of synthetic non-malware code; and generating, by the one or more processors, the antimalware machine-learning model using, at least, the first set of synthetic malware code and the second set of synthetic non-malware code, wherein the antimalware machine-learning model is employed in an antimalware application;

wherein the first library of malware training sets comprising the plurality of malware code comprises a plurality of binary files, each comprising a malware code portion;

wherein the plurality of binary files are parsed to provide a binary segment comprising the malware code portion, and wherein each of the plurality of parsed binary files have a same binary length as inputs to the first generative adversarial network; and wherein each of the plurality of instruction codes of the non-malware training set has the same binary lengths when provided as inputs to the second generative adversarial network.

2. The method of claim 1, wherein the first generative adversarial network comprises a first deep neural network configured as a generator and a second deep neural network configured as a discriminator, and wherein the second generative adversarial network comprises a third deep neural network configured as a generator and a fourth deep neural network configured as a discriminator, wherein the first deep neural network and the third deep neural network comprise different weight values among the different layers.

3. The method of claim 1, wherein the first generative adversarial network comprises a first set of loss functions that are employed in the first discriminator and the first generator, wherein the second generative adversarial network comprises a second set of loss functions that are employed in the second discriminator and the second generator, and wherein the first set of loss functions is different from the second set of loss functions.

4. The method of claim 1, wherein the first generative adversarial network comprises a first set of loss functions that are employed in the first discriminator and the first generator, wherein the second generative adversarial network comprises a second set of loss functions that are employed in the second discriminator and the second generator, and wherein the first set of loss functions and the second set of loss functions have the same equation topology or type.

5. The method of claim 3, wherein the first set of loss functions or the second set of loss functions comprises at least one of a minimax loss function, a modified minimax loss function, a Wasserstein loss function, and a combination thereof.

6. The method of claim 1, wherein the malware code comprises a virus code, a spyware code, a trojan code, or a snooping code.

7. A system comprising:
one or more computing systems having one or more processors and memory having instructions stored thereon, wherein execution of the instructions by the one or more processors causes the one or more processors to execute:
a first generative adversarial network, wherein the first generative adversarial network is configured using a first library of malware training sets comprising a plurality of malware code, wherein the first generative adversarial network is configured to generate a first set of synthetic malware code;
a second generative adversarial network, wherein the second generative adversarial network using a second library of non-malware training sets comprising a plurality of instruction code, wherein the second generative adversarial network is configured to generate a second set of synthetic non-malware code; and
an antimalware machine-learning model configured to operate in an antimalware application, wherein the antimalware machine-learning model is configured using, at least, the first set of synthetic malware code and the second set of synthetic non-malware code;
wherein the first library of malware training sets comprising the plurality of malware code comprises a plurality of binary files, each comprising a malware code portion;
wherein the plurality of binary files are parsed to provide a binary segment comprising the malware code portion, and wherein each of the plurality of parsed binary files have a same binary length as inputs to the first generative adversarial network; and
wherein each of the plurality of instruction codes of the non-malware training set has the same binary lengths when provided as inputs to the second generative adversarial network.

8. The system of claim 7, wherein the first generative adversarial network comprises a first deep neural network configured as a generator and a second deep neural network configured as a discriminator, and wherein the second generative adversarial network comprises a third deep neural network configured as a generator and a fourth deep neural network configured as a discriminator, wherein the first deep neural network and the third deep neural network comprise different weight values among the different layers.

9. The system of claim 7, wherein the first generative adversarial network comprises a first set of loss functions that are employed in the first discriminator and the first generator, wherein the second generative adversarial network comprises a second set of loss functions that are employed in the second discriminator and the second generator, and wherein the first set of loss functions is different from the second set of loss functions.

10. The system of claim 7, wherein the first generative adversarial network comprises a first set of loss functions that are employed in the first discriminator and the first generator, wherein the second generative adversarial network comprises a second set of loss functions that are employed in the second discriminator and the second generator, and wherein the first set of loss functions and the second set of loss functions have the same equation topology or type.

11. The system of claim 9, wherein the first set of loss functions or the second set of loss functions comprises at least one of a minimax loss function, a modified minimax loss function, or a Wasserstein loss function.

* * * * *